(12) United States Patent
Haxell et al.

(10) Patent No.: US 7,720,382 B2
(45) Date of Patent: May 18, 2010

(54) TIME-DOMAIN WAVELENGTH INTERLEAVED NETWORK WITH COMMUNICATIONS VIA HUB NODE

(75) Inventors: Penelope E. Haxell, Waterloo (CA); Gordon Thomas Wilfong, Bedminster, NJ (US); Peter M. Winkler, Madison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1724 days.

(21) Appl. No.: 10/826,151

(22) Filed: Apr. 16, 2004

(65) Prior Publication Data

US 2005/0232633 A1    Oct. 20, 2005

(51) Int. Cl.
   *H04J 14/00* (2006.01)
(52) U.S. Cl. .............................. 398/75; 398/47; 398/61; 370/398; 370/422; 370/426
(58) Field of Classification Search .................. 398/47, 398/53, 204, 306, 58, 59, 61, 63, 45, 49, 398/75, 43, 46, 48; 370/398, 422, 426, 465, 370/351, 352, 466, 467, 468, 395.4, 498
See application file for complete search history.

(56) References Cited

U.S. PATENT DOCUMENTS

| | | | | |
|---|---|---|---|---|
| 5,452,115 A | * | 9/1995 | Tomioka | ...................... 398/75 |
| 5,559,624 A | * | 9/1996 | Darcie et al. | .................. 398/72 |
| 5,774,658 A | * | 6/1998 | Kalkunte et al. | ............. 709/230 |
| 5,963,350 A | * | 10/1999 | Hill | ............................... 398/70 |
| 6,417,944 B1 | * | 7/2002 | Lahat et al. | .................... 398/79 |
| 6,592,272 B1 | * | 7/2003 | Masucci et al. | ................ 398/47 |
| 6,798,781 B1 | * | 9/2004 | Hill | .............................. 370/398 |
| 7,190,903 B1 | * | 3/2007 | Combs et al. | .................. 398/71 |
| 7,349,629 B1 | * | 3/2008 | Soderberg et al. | .............. 398/60 |

OTHER PUBLICATIONS

Widjaja et al., "Light Core and Intelligent Edge for a Flexible, Thin-Layered, and Cost-Effective Optical Transport Network," IEEE Optical Communications, pp. S30-S36 (May 2003).
U.S. Appl. No. 10/411,039, filed Apr. 10, 2003, Giles et al.
U.S. Appl. No. 10/426,388, filed Apr. 30, 2003, Giles et al.

* cited by examiner

*Primary Examiner*—Hanh Phan
(74) *Attorney, Agent, or Firm*—Ryan, Mason & Lewis, LLP (57) ABSTRACT

A system and method are disclosed for time-domain wavelength interleaved networking that reduce the need for complex time-slot scheduling and reduce the routing complexity. Substantially all communications in the time-domain wavelength interleaved network pass through a hub node. In addition, interior nodes in the time-domain wavelength interleaved network will forward substantially all communications received from the hub node that are destined for another node on all branches outward from the hub node. The central hub node can impose a timing reference. Thus, the transmission and reception of a message can be synchronized such that a message sent in a time-slot k by a node $N_i$ will be received by a node $N_j$ in the time-slot k. Further, the hub node can recover from a link failure by shifting transmission times of all nodes that are separated from the hub node by the failed link.

18 Claims, 5 Drawing Sheets

(PRIOR ART)

TIME-DOMAIN WAVELENGTH INTERLEAVED NETWORK WITH COMMUNICATIONS VIA HUB NODE

FIELD OF THE INVENTION

The present invention relates to optical communication networks and, more particularly, to time-domain wavelength interleaved networks.

BACKGROUND OF THE INVENTION

Optical communication systems increasingly employ wavelength division multiplexing (WDM) techniques to transmit multiple information signals on the same fiber, and differentiate each user sub-channel by modulating a unique wavelength of light. WDM techniques are being used to meet the increasing demands for improved speed and bandwidth in optical transmission applications. For each ordered pair ($N_i$, $N_j$) of nodes in a wavelength division multiplexing network, one could assign a wavelength $\lambda_{ij}$ so that data sent from node $N_i$ to node $N_j$ is always sent on the $\lambda_{ij}$ wavelength along some path from node $N_i$ to node $N_j$. Distinct wavelengths can be assigned to each such communicating pair of nodes, if there are a sufficient number of wavelengths available, or the same wavelength could be assigned to a number of such node pairs, provided that the paths used are disjoint. In general, however, the number of wavelengths needed is quadratic with the number of network nodes. The capacity of a wavelength, however, far exceeds the typical communication load between nodes. Thus, it would be advantageous if the capacity of a wavelength could be shared in some way.

I. Widjaja et al., "Light Core and Intelligent Edge for a Flexible, Thin-Layered and Cost-Effective Optical Transport Network," IEEE Optical Communications, S30-36 (May, 3003) incorporated by reference herein, proposed a network architecture, referred to as Time-domain Wavelength Interleaved Networking (TWIN), that combines wavelength division multiplexing and time division multiplexing techniques. Generally, according to the TWIN architecture, each node $N_i$ is assigned a distinct wavelength $\lambda_i$ and all other nodes send signals to $N_i$ using $\lambda_1$ in a time-shared manner. Thus, the number of wavelengths required is equal to the number of nodes rather than quadratic in the number of nodes. Each node can then be assigned time-slot(s) in which the node is permitted to send data to node $N_i$ with the time-slots chosen so that no two nodes send signals to node $N_i$ in the same time slot. In addition, a node can transmit a signal to at most one node during a given time slot. Scheduling time-slots in this manner is often challenging. TWIN also requires nodes in the network to function essentially as routers where the wavelength of a signal determines the outbound link for the signal.

A need therefore exists for a system and method for time-domain wavelength interleaved networking that reduce the need for complex time-slot scheduling and reduce the routing complexity.

SUMMARY OF THE INVENTION

Generally, a system and method are disclosed for time-domain wavelength interleaved networking that reduce the need for complex time-slot scheduling and reduce the routing complexity. According to one aspect of the invention, substantially all communications in the time-domain wavelength interleaved network pass through a hub node. In addition, interior nodes in the time-domain wavelength interleaved network will forward substantially all communications received from the hub node that are destined for another node on all branches outward from the hub node.

According to another aspect of the invention, since substantially all communications pass through the hub node, the hub node can impose a timing reference. In this manner, the transmission and reception of a message can be synchronized such that a message sent in a time-slot k by a node $N_i$ will be received by a node $N_j$ in the time-slot k. Further, the hub node can recover from a link failure by shifting transmission times of all nodes that are separated from the hub node by the failed link.

A more complete understanding of the present invention, as well as further features and advantages of the present invention, will be obtained by reference to the following detailed description and drawings.

DETAILED DESCRIPTION

The present invention improves the TWIN architecture by reducing the need for complex time-slot scheduling and the routing complexity of most nodes. In particular, the architecture of the present invention requires less complex equipment at all interior nodes except one specially designated hub node (that will require the same equipment as an interior TWIN node).

Conventional TWIN Network

Figure 1:
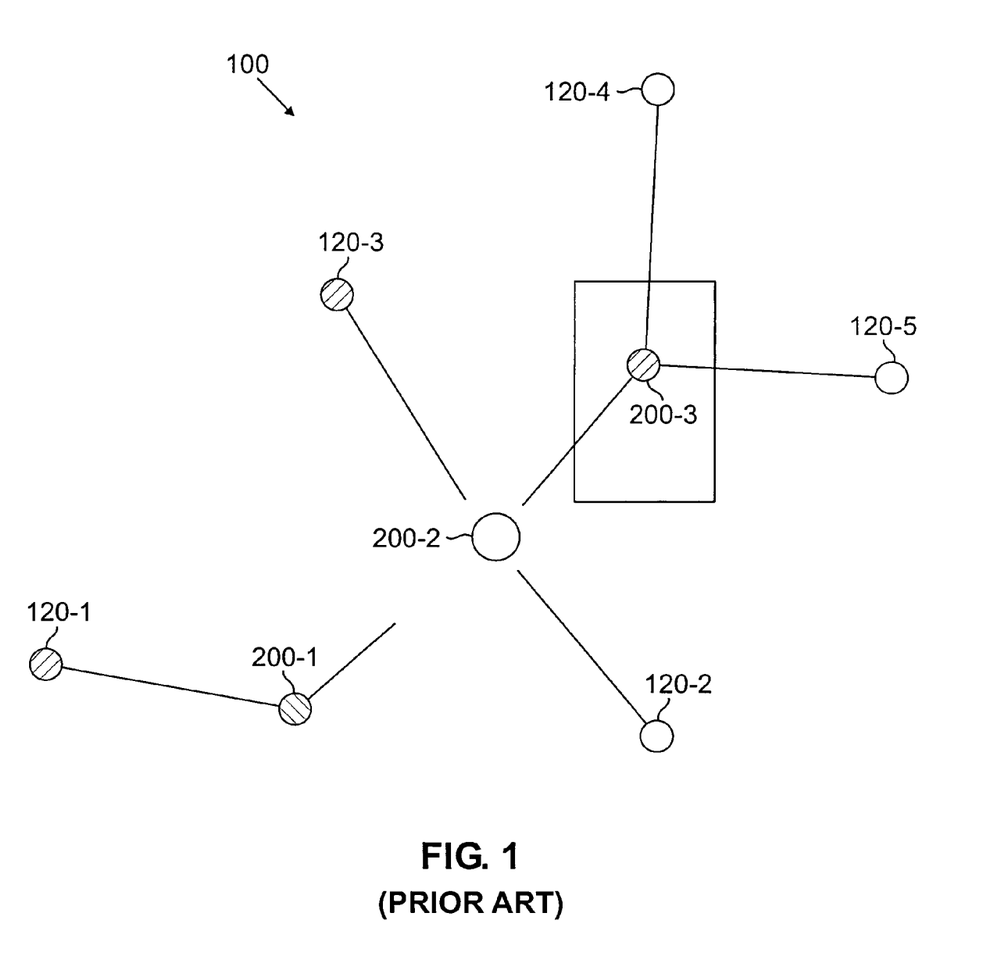
FIG. 1 illustrates a conventional TWIN network.

FIG. 1 illustrates a network 100 according to the conventional TWIN architecture. As shown in FIG. 1, the network 100 is a connected graph of nodes 120, 200, where each edge $N_iN_j$ in the graph represents the fact that there is a directed fiber from $N_i$ to $N_j$ and an oppositely directed fiber from $N_j$ to $N_i$. Nodes 120, 200 represent locations where signals can originate or terminate and where switching can be performed. The network 100 includes one or more leaf nodes 120-1 through 120-5 and one or more interior nodes 200-1 through 200-3 (hereinafter, collectively referred to as interior nodes 200, discussed further below in conjunction with FIG. 2).

In general, for each node $N_i$, a spanning tree $T_i$ of the network 100 can be defined so that for any other node $N_j$, signals from $N_j$ to $N_i$ are sent along the path in TI from $N_j$ to $N_i$. Each node $N_i$ is assigned a wavelength $\lambda_i$ on which the other nodes will send signals to $N_i$. Thus, whenever a node 120, 200 other than $N_i$ gets an incoming signal on $\lambda_i$, the node 120, 200 routes the signal along the outgoing fiber that leads to node $N_i$ in the tree $T_i$. It is noted that for simplicity, some fixed spanning tree T can be chosen with $T_i=T$ for all $N_i$.

At each node 120, 200, there is a tunable laser (not shown in FIG. 1), that can operate at any of the assigned wavelengths for any given period of time. Time is partitioned into equal length disjoint time-slots. Each node $N_i$ requires some number $d_{ij}$ of time-slots in which to send data to each other node $N_j$. The demand from $N_i$ to $N_j$ is referred to as $d_{ij}$. The demand is satisfied by a schedule S if during S, for every i and j, the laser at $N_i$ is scheduled to operate at wavelength $\lambda_j$ over $d_{ij}$ time-slots.

Scheduling the tunable lasers at each node 120, 200 to satisfy these requirements has several constraints. Since the tunable laser at a node $N_i$ can operate at only one wavelength over a given time-slot, the schedule must not require any node $N_i$ to transmit to more than one receiving node during a particular time-slot. Also, if two signals of the same wavelength collide along the path towards a node then the two signals will interfere with one another and data will be lost. Thus, the schedule must guarantee that no two signals to a given node $N_i$ (i.e., signals on the same wavelength $\lambda_i$) meet along $T_i$. It is easily seen, however, that two signals on the same wavelength $\lambda_i$ never meet along $T_i$ if and only if their arrival times at $N_i$ differ by at least the duration of a time-slot. A schedule consists of frames where the sub-schedule during each frame satisfies every demand. The same sub-schedule is assumed to be repeated in every frame. The goal of the scheduler is to find the shortest frame that allows all demands to be satisfied.

Figure 2:
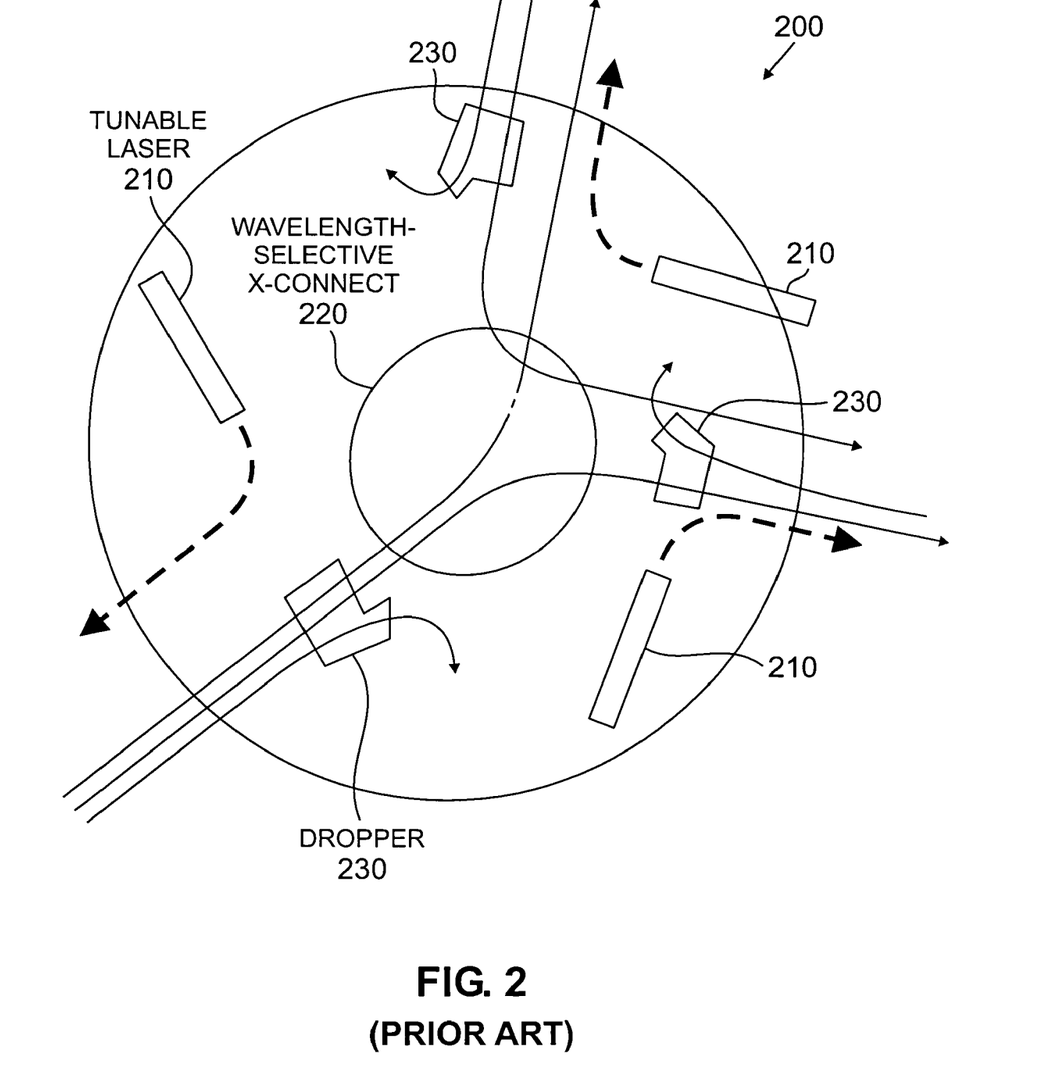
FIG. 2 is a schematic block diagram of an exemplary interior node of the conventional TWIN network of FIG. 1.

FIG. 2 is a schematic block diagram of an exemplary interior node 200 of the conventional TWIN network 100 of FIG. 1. As shown in FIG. 2, the exemplary interior node 200 includes a wavelength selective cross-connect 220 (assuming connectivity c>2) that passes a signal received on an incoming fiber from any direction to an outgoing fiber in any other direction, depending on the wavelength of the received signal. The wavelength selective cross-connect 220 includes a dropper 230 for each of c fibers, to drop its own wavelength from any incoming fiber. In addition, the interior node 200 includes a tunable laser 210 for each of c fibers, or one tunable laser 210 with a c-fold splitter, that can each operate at any of the assigned wavelengths for any given period of time.

Improved TWIN Network

Figure 3:
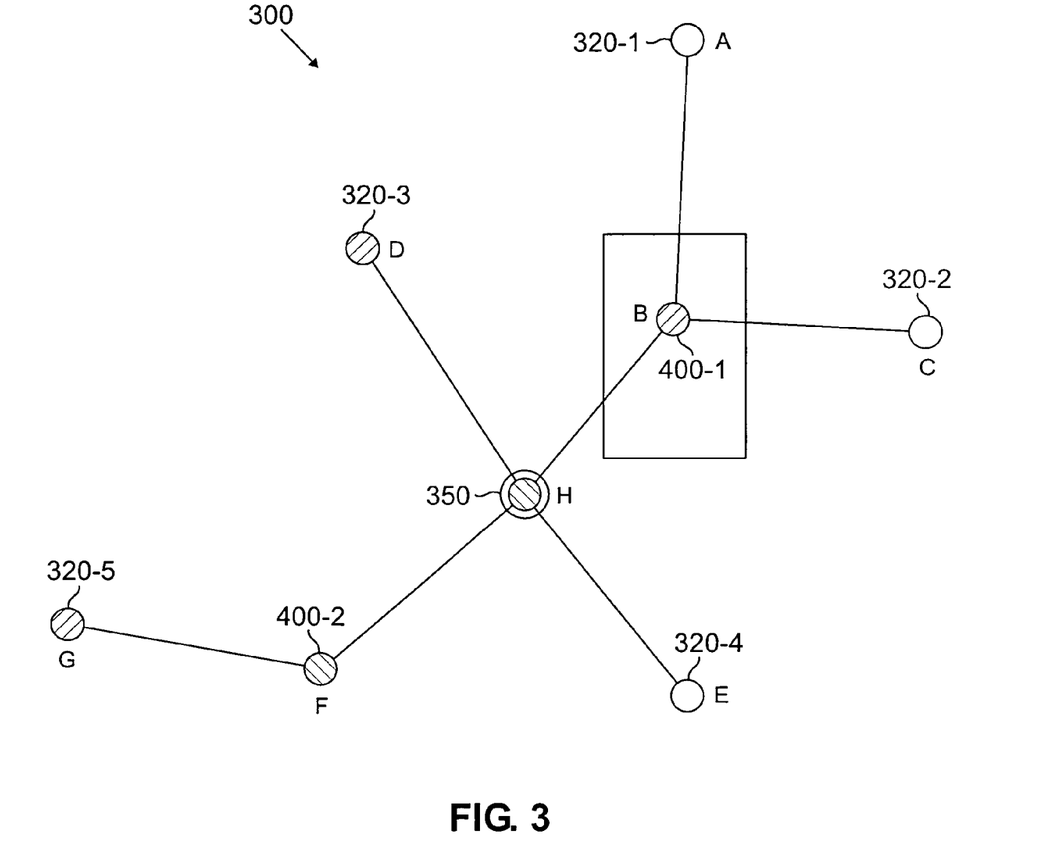
FIG. 3 illustrates a time-domain wavelength interleaved network incorporating features of the present invention.

FIG. 3 illustrates a time-domain wavelength interleaved network 300 incorporating features of the present invention. The time-domain wavelength interleaved network 300 is embodied using the above described principles of TWIN, as modified herein to provide the features and functions of the present invention. In particular, the time-domain wavelength interleaved network 300 operates on a two-fibered tree with a designated hub 350 or WDM-TDM ring 500, discussed further below in conjunction with FIG. 5, at its center. The network 300 includes one or more leaf nodes 320-1 through 320-5, one or more interior nodes 400-1 through 400-2, discussed further below in conjunction with FIG. 4, and the designated hub 350. As in the conventional TWIN network 100 of FIG. 1, each node $N_i$ 320, 350, 400 in the time-domain wavelength interleaved network 300 of FIG. 3 is associated with a wavelength $\lambda_i$ and reads signals only on that wavelength $\lambda_i$. Again, in each node, signals are sent by tunable lasers, discussed below in conjunction with FIG. 4, in a rotating schedule of time-slots so that messages sent by two different nodes to the same receiving node do not interfere with one another.

In conventional tree networks, such as the network 100 of FIG. 1, all messages are sent along a path in a tree between two nodes 120, 200. In the time-domain wavelength interleaved network 300 of the present invention, on the other hand, even messages between two nodes 320, 400 on the same branch pass through the hub 350. For example, as shown in FIG. 3, messages from node 320-1 to node 400-1, or from node 320-1 to node 320-2, pass through the hub 350. This would waste bandwidth in an ordinary optical network because the bandwidth on the link between nodes 400-1 and 350 could potentially have been used for other traffic. The present invention recognizes, however, that in TWIN networks, the wasted bandwidth is free. There can only be one message in a given time-slot on a given wavelength, otherwise there would be interference and the node receiving that wavelength would experience data loss.

As discussed further below, routing such messages through the hub 350 in accordance with the present invention increases effective bandwidth in the time-domain wavelength interleaved network 300, by enabling optimal time-slot scheduling. Routing such messages through the hub 350 also increases latency in the messages between nodes on the same branch from the hub 350, but for reasonable placements of the hub 350, not beyond the latency experienced by messages between nodes on different branches.

A leaf node 320 (e.g., nodes 320-1 through 320-5 in FIG. 3) behaves as it would in the conventional network 100, using its single tunable laser to send messages to desired recipients, and reading its own wavelength; nothing is passed through. According to one aspect of the present invention, discussed further below in conjunction with FIG. 4, an interior node 400 (nodes 400-1 or 400-2 in FIG. 3) has connectivity greater than one, but does not send its messages in all directions. As discussed below in conjunction with FIG. 4, all originating messages are directed by a single tunable laser toward the hub 350. Similarly, messages in the designated wavelength of the interior node 400 are read only from the direction of the hub 350. All traffic reaching the interior node 400 from the direction of the hub 350 is passed outward via a passive, wavelength-agnostic splitter 430 along each outgoing link other than the one towards the hub 350. All traffic from other directions is passed toward the hub 350 via a passive, wavelength-agnostic coupler 420. While passing all traffic reaching the node 400 from the direction of the hub 350 outward along each outgoing link results in more photons than necessary, there is no cost in effective bandwidth. Thus, the interior nodes 400 do not require any wavelength selective elements, other than to be able to drop the wavelength associated with the given node.

The hub 350 operates in a similar manner to an interior node 200 of the conventional TWIN network 100. Generally, the hub 350 reads its own wavelength from any direction and forwards other wavelengths each in the proper direction. The only operating difference is that in some cases traffic incoming from a branch consisting of more than one node is sent back out via the outgoing fiber for the same branch.

According to a further aspect of the invention, the time-domain wavelength interleaved network 300 extends the scheduling and provisioning advantages of a star network to a general tree network. It is noted that the time-domain wavelength interleaved network 300 of the present invention and the conventional TWIN network 100 are similar when the tree happens to be a star, i.e., the tree has no interior nodes 200, 400.

Figure 4:
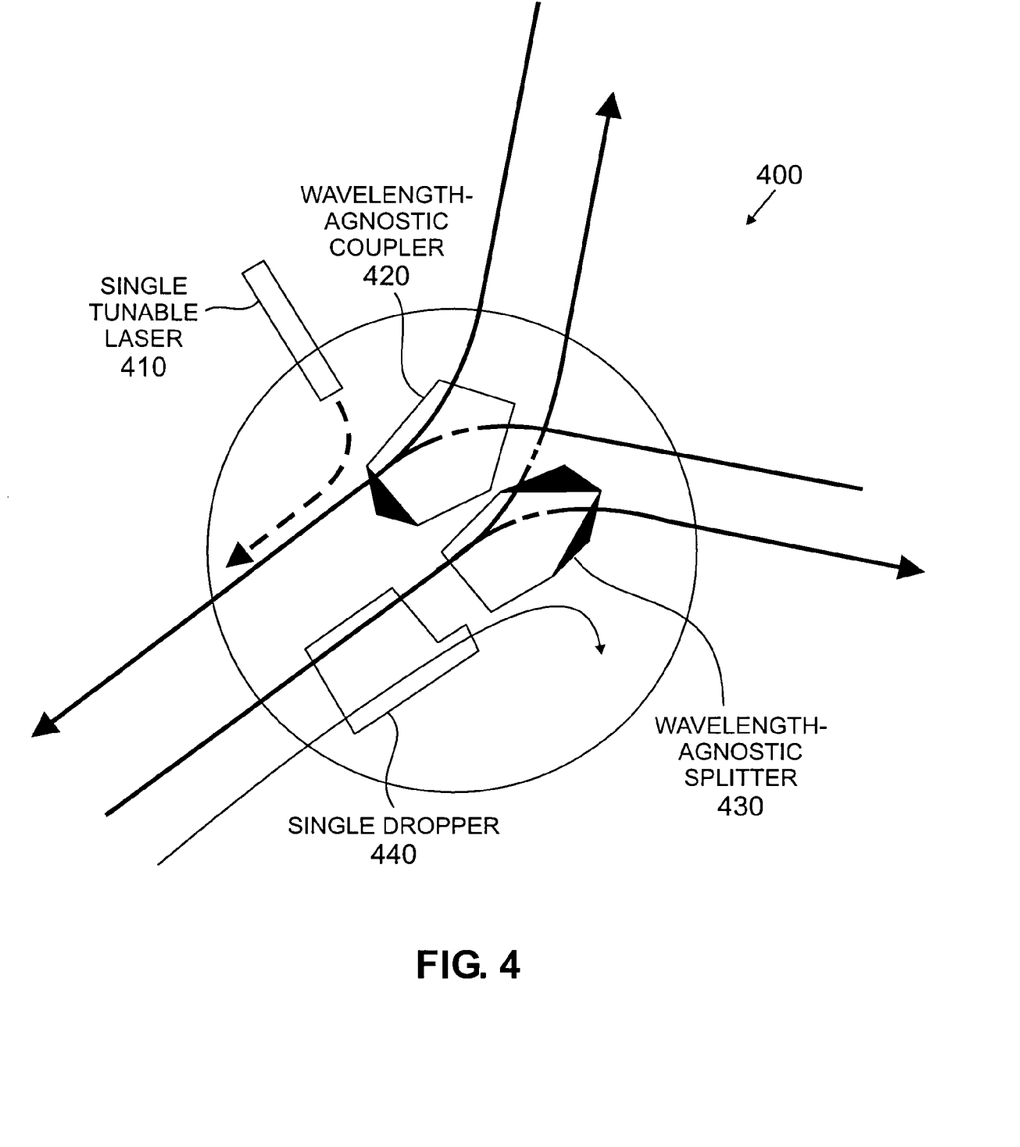
FIG. 4 is a schematic block diagram of an exemplary interior node of the time-domain wavelength interleaved network of FIG. 3.

FIG. 4 is a schematic block diagram of an exemplary interior node 400 of the time-domain wavelength interleaved network 300 of FIG. 3. As shown in FIG. 4, all originating messages are directed by a single tunable laser 410 toward the hub 350. As previously indicated, messages in the designated wavelength of the interior node 400 are read only from the direction of the hub 350 by a single dropper 440. All traffic from other directions is passed toward the hub 350 via a passive, wavelength-agnostic coupler 420. The wavelength-agnostic coupler 420 passes all traffic received from the direction opposite the hub 350 (inward) toward the hub 350. In addition, a passive, wavelength-agnostic splitter 430 passes all traffic reaching the interior node 400 from the same direction as the hub 350 outward along each outgoing link other than the one towards the hub 350.

Thus, relative to the conventional interior node 200 of FIG. 2, the interior node 400 of the present invention only needs one tunable laser 410, directed toward the hub 350. The interior node 400 drops its own wavelength only from the fiber coming from the hub 350. For through traffic, the interior node 400 needs no cross-connect or wavelength selectivity. Traffic from the hub 350 is passed toward the leaf nodes 320 via a passive 1×(c−1) splitter 430, and traffic toward the hub 350 is merged via a passive (c−1)×1 combiner 420, where c is the connectivity of the node (i.e., the number of edges incident at the node).

It is noted that interior nodes of connectivity only two require no combiners 420, splitters 430 or cross-connects in either the conventional TWIN network of FIG. 1, or the network 300 of the present invention (FIG. 3), but in the network 300 of the present invention, interior nodes of connectivity, c, only two need only drop and transmit in one direction instead of two.

Time-Slot Scheduling

According to another aspect of the invention, since all communications in the network 300 of the present invention pass through the hub 350, the hub 350 can impose an absolute timing reference. Among other benefits, transmission in the time-domain wavelength interleaved network 300 can be synchronized to allow easy, maximum-efficiency time-slot scheduling, regardless of line lengths.

In the conventional TWIN network 100, time-slots must be assigned (either off-line, in response to anticipated traffic demands, or on-line, in response to immediate needs) so that (1) no node is required to send traffic in overlapping time-slots, and (2) no wavelength is used in overlapping time-slots along any fiber.

If time-slot length is large compared to maximum delay, the off-line problem is easily solved using Konig's Theorem, and the on-line problem is handled nicely by simple heuristics. Suppose, for example, that traffic demand requires $d_{ij}$ time-slots for communication from node $N_i$ to node $N_j$; then $d:=\max(\max_i \Sigma_j d_{ij}, \max_j \Sigma_i d_{ij})$ is the maximum number of time-slots required for transmission or reception by any node, and thus at least d time-slots are necessary in the rotating schedule. Konig's Theorem tells us, in the off-line case, that d time-slots are in fact sufficient. Even if every node demands all d time-slots for input and all d for output, a perfect schedule exists and is easily found. See, e.g., D. Konig, Graphok és alkalmazásuk a determinansok és a halmazok elméletére {Hungarian}, Mathematikai és Természettudományi Értesito 34, 104-119 (1916); or J. H. van Lint and R. M. Wilson, A Course in Combinatorics, Chapter 5, Thm 5.4, page 39, Cambridge U. Press (1992).

The ideal time-slot size (on the order of a few microseconds) for the conventional TWIN network 100 is comparable to speed-of-light delays even in a metropolitan network. Time-slots sent on a given wavelength at non-overlapping times may interfere when they arrive. Arrival time-slots (and, for maximum efficiency, departing time-slots as well) no longer occupy integral time points and even if they did, Konig's Theorem fails. The time-slot scheduling problem becomes immensely more complicated and could cost as much as a factor of three in bandwidth efficiency. It has been found that the loss of efficiency caused by transmission delay will be far less. The complexity of scheduling with delays may outweigh the actual loss of efficiency as a practical consideration.

The scheduling payoff for the time-domain wavelength interleaved network 300 of the present invention is that time-slot scheduling can be done as if there were no delays. The key is that transmission and reception can be synchronized by the hub 350 (as in a star network) so that a message sent in transmitting time-slot k from node $N_i$ to node $N_j$ always arrives precisely in receiving time-slot k. There may also be some additional advantage incurred by receiving in regular integer time-slots.

Let $t_i$ be the delay incurred by the traffic from node $N_i$ to the hub 350, and $\pi_i$ be the delay (usually the same) for traffic from the hub 350 to node $N_i$. Let s be the length of a time-slot. As in a conventional TWIN network 100, transmissions are scheduled in frames, each frame consisting of a fixed number of time-slots. Assume that frames consist of w time-slots numbered 0 through w−1. Consider a transmission from node $N_i$ to node $N_j$ that has been assigned time-slot k. Then node $N_i$ transmits on wavelength $\lambda_j$ starting at times $0 \leq ks−t_i+mw$ for $m \epsilon Z_0$ for a duration of s. Then, the hub 350 will start to receive this signal at times ks+mw for each such m. Also, node $N_j$ will receive this signal starting at times $ks+mw+\pi_j$ for relevant values of m and lasting for a duration of s. Then, two distinct time-slots of traffic to node $N_j$ are transmitted at non-overlapping times if they are sent from the same originating node, they occur at the hub at non-overlapping intervals of time and occur at the destination node $N_j$ over non-overlapping intervals of time. Thus, throughout the network 300, distinct time-slots on a particular wavelength never interfere with one another.

In the case of symmetric delays, the nodes can synchronize transmissions since all the nodes need is to time the receipt of a message from the hub 350 containing its schedule (and the value w, if that has been changed). If delays are for some reason asymmetric, transmission times with node identities are sent toward the hub 350 and the hub 350 sends back the necessary corrections.

Signaling

According to another aspect of the invention, the positioning of the hub 350 in the time-domain wavelength interleaved network 300 allows the hub node 350 to do time-slot scheduling and general in-band signaling, as well as synchronization. For example, if the wavelength of the hub 350 is "black", each other node will have a time-slot reserved in the black wavelength, and correspondingly the hub 350 will have a time-slot reserved on each of the wavelengths of the other nodes. These time-slots are used for signaling, synchronization, time-slot schedule distribution and other management traffic.

For example, in an off-line scheduling implementation, each node will report to the hub 350, on its designated time-slot in the black wavelength, giving the number of time-slots the node needs for transmission to specified other nodes. The hub 350 solves the scheduling problem and passes the time-slot assignments back out to each node in the hub's time-slot on that node's designated wavelength.

For an on-line scheduling implementation, each node will report to the hub 350 when its buffer occupation suggests that the node needs more time-slots for transmission to some specified other node. The hub 350 can use heuristics to assign time-slot numbers on the fly to the requesting node. Conceivably, heavy signaling traffic and heavy ordinary traffic for the hub node 350 could force the hub to have separate wavelengths for the two functions.

Restoration

As in any tree network, if a link goes down, the network 300 is reduced to two connected components, and a fiber link (or sequence of links) must be enlisted to reconnect them. For the time-domain wavelength interleaved network 300, each link (say, from node $N_i$ to node $N_j$) can be associated with a fiber path from $N_i$ to $N_j$, some of whose links, but none of whose fiber, may already be in operation. The advantage of the time-domain wavelength interleaved network 300 in this scenario is that the assignment of time-slots to demand does not need to be redone; the only change necessary is a shift of transmission timing by nodes which were separated from the hub 350 by the downed link. If the old delay along the link $N_iN_j$ was $t_{ij}$ and the delay of the replacement path is $t'_{ij}$, then each such node shifts its entire transmission schedule up in time by the amount $t'_{ij}$-$t_{ij}$.

Extending the Ring Network

Figure 5:
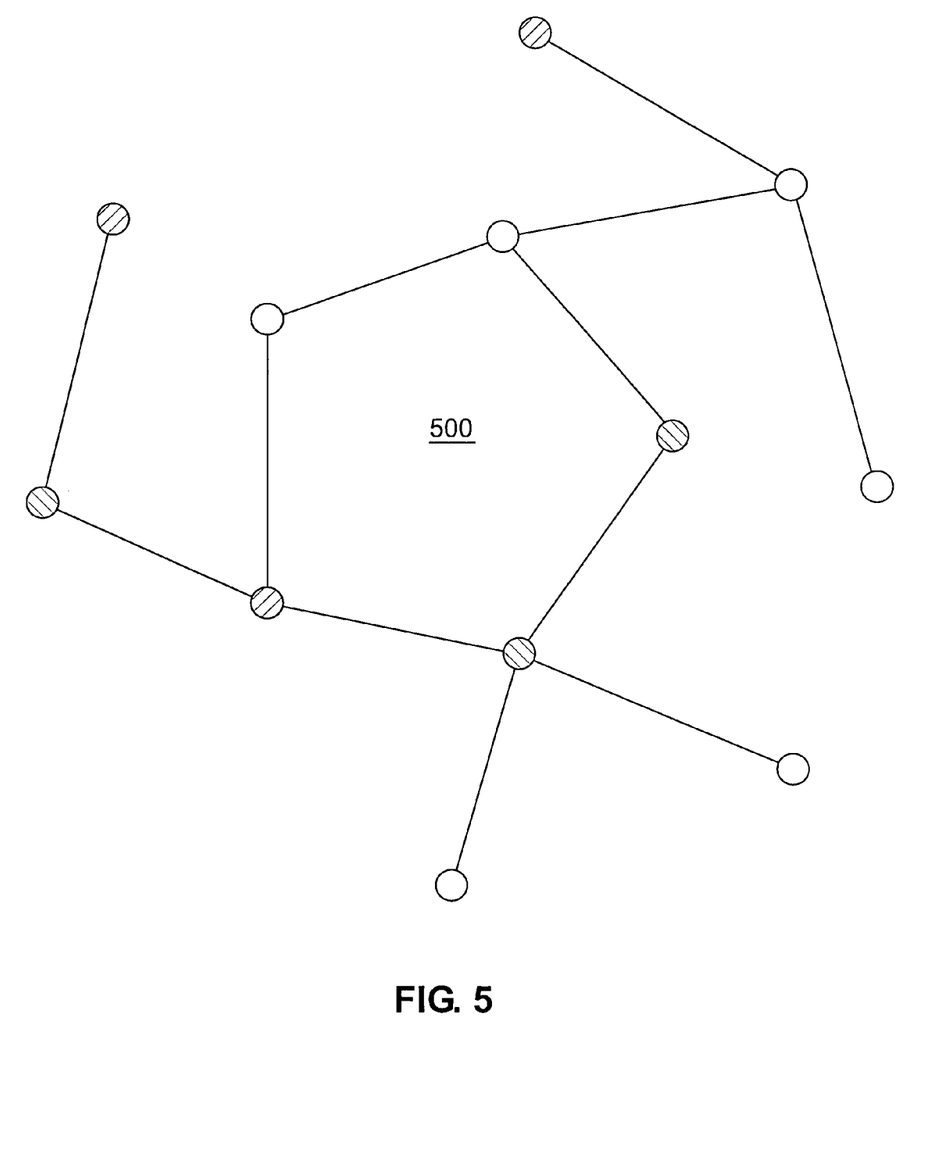
FIG. 5 illustrates an exemplary WDM-TDM ring network.

FIG. 5 shows a WDM-TDM ring 500 extended to a general unicyclic graph. The WDM-TDM ring 500 can be operated in the same manner as the time-domain wavelength interleaved network 300 of FIG. 3, provided the ring 500 itself satisfies the conditions necessary for scheduling as if there were no delays.

Let t be the total delay around the ring 500, s the time-slot length and w the number of time-slots in one frame of the schedule. If sw divides t, i.e., if t/sw is an integer, then a time-slot sent by any fixed node of the ring 500 comes back around to that node synchronized and in the same numbered position. Thus, assuming all (primary) traffic travels around the ring 500 in the same direction, the transmission times can be synchronized so that delays can be ignored in scheduling. If the ring is short, so that t is small compared with s, the same effect can be achieved by allowing a small gap between time-slots.

The remaining nodes of the network 500 synchronize as follows: if the path from node $N_i$ to the ring 500 hits the ring 500 at node $N_j$, node $N_i$ schedules its transmissions exactly as if it were in a time-domain wavelength interleaved network 300 tree with node $N_j$ as its hub 350. For schedule propagation and/or signaling, any of the nodes in the ring 500 can be designated to play the role described above for the hub 350 of a tree network.

Latency

In the time-domain wavelength interleaved network 300 of FIG. 3, traffic between two nodes on the same branch of the hub 350 travels farther than it needs to. While this increases latency, the effect on maximum latency in the network will be small unless the tree is severely unbalanced. For example, in FIG. 3, traffic from node A to node C travels four links (to nodes 350, 400-1 and 400-2 again before reaching node 320-2) instead of two. However, traffic from node 320-1 to node 320-5 requires four links anyway.

Power

The splitters 430 and combiners 420 used in interior nodes 400 of the time-domain wavelength interleaved network 300 cause a loss in power, typically by a factor of c−1 for a node of connectivity c. Of course, this may apply also to the use of wavelength-selective cross-connects in conventional TWIN networks 100. In either case, the loss must of course be taken into account, and in a complex network optical amplifiers may be necessary to compensate.

Hub Reliance

All traffic goes through the hub 350, and the hub 350 optionally manages signaling and synchronization. Thus, if the hub 350 cannot operate, the time-domain wavelength interleaved network 300 is disabled. In practice, it may be desirable to duplicate equipment at the hub 350, or to provision another node to take its place in an emergency.

It is to be understood that the embodiments and variations shown and described herein are merely illustrative of the principles of this invention and that various modifications may be implemented by those skilled in the art without departing from the scope and spirit of the invention.

We claim:

1. A method for communicating in a time-domain wavelength interleaved network having a hub node, comprising:

transmitting substantially all communications through said hub node without changing a wavelength of said communications at said hub node; and synchronizing a transmission and reception of a message such that a message sent in a transmitting time-slot k by a node $N_i$ is received by a node $N_j$ in a receiving time-slot k, wherein said synchronizing step is performed by said hub node using a delay from said node $N_i$ to said hub node to determine said transmitting time-slot k.

2. The method of claim 1, wherein said hub node imposes a timing reference.

3. The method of claim 1, wherein said hub node recovers from a link failure by shifting transmission times of nodes separated from said hub node by said failed link.

4. The method of claim 1, wherein said node $N_i$ is assigned a wavelength $\lambda_i$ on which other nodes will send signals to said node $N_i$.

5. A method for communicating performed by an interior node in a time-domain wavelength interleaved network having a hub node, comprising:

sending substantially all communications received from said hub node having a wavelength indicating said communication is destined for another node on all branches outward from said hub node without changing a wavelength of said communication at said hub node, wherein a transmission and reception of a message are synchronized such that a message sent in a transmitting time-slot k by a node $N_i$ is received by a node $N_j$ in a receiving time-slot k, wherein said synchronization is performed by said hub node using a delay from said node $N_i$ to said hub node to determine said transmitting time-slot k.

6. The method of claim 5, wherein said node $N_i$ is assigned a wavelength $\lambda_i$ on which other nodes will send signals to said node $N_i$.

7. A node in a time-domain wavelength interleaved network having a hub node, comprising:

a tunable laser directed toward said hub node; and a wavelength dropper for dropping signals having a wavelength associated with said node only from a fiber coming from said hub node, wherein substantially all communications in said time-domain wavelength interleaved network are transmitted through said hub node without changing a wavelength of said communications at said hub node and wherein a transmission and reception of a message are synchronized such that a message sent in a transmitting time-slot k by a node $N_i$ is received by a node $N_j$ in a receiving time-slot k, wherein said synchronization is performed by said hub node using a delay from said node $N_i$ to said hub node to determine said transmitting time-slot k.

8. The node of claim 7, wherein said hub node imposes a timing reference.

9. The node of claim 7, wherein said hub node performs a time-slot scheduling without regard to a delay in said time-domain wavelength interleaved network.

10. The node of claim 7, wherein said hub node recovers from a link failure by shifting transmission times of nodes separated from said hub node by said failed link.

11. The node of claim 7, wherein said node $N_i$ is assigned a wavelength $\lambda_i$ on which other nodes will send signals to said node $N_i$.

12. A time-domain wavelength interleaved network, comprising:

a plurality of nodes, including a hub node, wherein substantially all communications in said time-domain wavelength interleaved network pass through said hub node without changing a wavelength of said communications at said hub node and wherein a transmission and reception of a message are synchronized such that a message sent in a transmitting time-slot k by a node $N_i$ is received by a node $N_j$ in a receiving time-slot k, wherein said synchronization is performed by said hub node using a delay from said node $N_i$ to said hub node to determine said transmitting time-slot k.

13. The time-domain wavelength interleaved network of claim 12, wherein said hub node imposes a timing reference.

14. The time-domain wavelength interleaved network of claim 12, wherein said hub node performs a time-slot scheduling without regard to a delay in said time-domain wavelength interleaved network.

15. The time-domain wavelength interleaved network of claim 12, wherein said hub node recovers from a link failure by shifting transmission times of nodes separated from said hub node by said failed link.

16. The time-domain wavelength interleaved network of claim 12, further comprising a plurality of said nodes interconnected in a tree configuration.

17. The time-domain wavelength interleaved network of claim 12, further comprising a plurality of trees of nodes, each of said trees having a hub node, each of said hub nodes interconnected in a ring configuration.

18. The time-domain wavelength interleaved network of claim 12, wherein said node $N_i$ is assigned a wavelength $\lambda_i$ on which other nodes will send signals to said node $N_i$.

* * * * *